3,775,377
COMPOSITION FOR PREPARING RESIN COATING FILM AND THE LIKE
Tomoo Kokawa, Hiratsuka, Japan, assignor to Kansai Paint Co., Ltd., Hyogo-ken, Japan
No Drawing. Filed Aug. 3, 1972, Ser. No. 277,742
Claims priority, application Japan, Aug. 12, 1971, 46/60,656
Int. Cl. C08g 22/08
U.S. Cl. 260—77.5 CR                12 Claims

ABSTRACT OF THE DISCLOSURE

A composition of the present invention for preparing a resin coating film contains a reaction product having an unsaturation equivalent of 800 to 3500 and a carboxylic equivalent of 300 to 1800, in which the reaction product is obtained by reacting an addition product of a polymerizable unsaturated vinyl monomer having one hydroxyl group and polyisocyanate with acrylic polymer having a hydroxy equivalent of 500 to 3000, a carboxylic equivalent of 200 to 1700 and a number average molecular weight of about 300 to about 100,000, and further contains a urethanated polymerizable compound obtained by reacting a mono- or di-hydroxy carboxylic acid, polyisocyanate compound and polymerizable unsaturated vinyl monomer having one hydroxyl group.

---

This invention relates to a composition for preparing a novel resin.

Further, the invention relates to a composition for preparing said resin to form, for example, a coating film which can be cured easily and adhered tightly to the surfaces of various materials coated.

Still further, the invention relates to a composition for preparing said resin which can be used for forming excellent coatings, paints, photolithographs, embossed patterns, etc.

In the prior art, it is well known that an ethylenically unsaturated compound such as 2-hydroxyethyl methacrylate and a polyisocyanate such as tolylene diisocyanate as the curable components, are caused to react to form a polyfunctional compound having two or more ethylenically unsaturated bonds which are connected through urethane bonds. Further, it is also known that the molecular weight, solubility and other properties of polymer can be modified by introducing dihydroxy compounds such as polyethylene glycol and polypropylene glycol between the urethane bonds at the terminals of two polyisocyanate compounds. Still further, it is a common practice for the above product, a so-called, acrylurethane admixed with other compatible resins such as acrylic resin or cellulose derivatives.

These acryl-urethane compositions are superior in their curing property, so that they can be cured easily through several methods, for example, the addition of a polymerization initiator and the irradiation of actinic rays or ionizing radiation. In addition, the cured compositions have excellent properties such as mechanical strength and chemical resistance, so that they are generally employed as the basic materials of paints, coatings, photolithographs, etc.

However, although the cured acryl-urethane composition has good mechanical strength and bending property, it contains many urethane bonds which are strong in their adhesive force, and therefore has the defect that the adhesion to the surface of substrate is not always sufficient. Accordingly, a pretreatment, such as coating with a proper under-coat on the surface of substrate, is necessary in order to improve the adhesiveness of the coating applied. Also, the adhesion to the substrate may be improved by mixing the acryl-urethane composition with a cellulose derivative a free carboxylic group such as acetyl phthalyl cellulose by utilizing the polarity thereof. However, the cellulose derivative consists of a rather stiff glucose unit and has only a little effect to relieve the internal stress in the molecule, and therefore, the effect in adhesiveness by the use of the cellulose derivative is not large enough.

Accordingly, the inventor of the persent invention has carried out various extensive studies in order to eliminate these defects caused in the ordinary acryl-urethane compositions, and as the result, the fundamental feature of the present invention has been completed.

Being different from the ordinary acryl-urethane composition, the composition of the present invention has a principal characteristic in that it contains a free carboxylic group in the molecular structure of the acryl-urethane. By the provision of the free carboxylic group in the molecule of the acryl-urethane, the adhesiveness of the cured composition to the surface of substrate can be very much improved by the effect of the polarity of the carboxylic group. In addition, the uncured composition of the invention can be easily washed out by a dilute aqueous alkaline solution. Therefore, the composition of the invention can be used advantageously, also for example, for the photolithograph and photoresist.

With regard to a coating composition such as a paint composition, it is generally practised that the compound having polar functional group, such as a carboxylic group, is used as the main resinous component in order to improve the adhesiveness of the coating composition to the surface of the material to be coated. The provision of the carboxylic group in the resinous component may be effective in some cases, for example, in coating compositions for surfaces of wood and iron, however, it can not give sufficient adhesiveness in other cases, for example, to the surfaces of non-ferrous metals such as aluminum and copper or of siliceous materials.

Additionally, it is well known that a resin having a urethane bond in its molecular structure gives a coating with excellent mechanical strength owing to the cohesion property of the contained urethane bond. However, on account of the adhesion property thereof, it is inferior in adhesiveness of the resin to the surface of substrate. Therefore, for example, an acrylic resin having a carboxylic group which is combined with a urethane bond has been tried but the acid value thereof had to be kept less than only 30 so as to maintain the stability of mixed basic pigment in the ordinary paint composition.

A composition of the present invention for preparing resin coating film contains a reaction product having an unsaturation equivalent of 800 to 3500 and a carboxylic equivalent of 300 to 1800, in which the reaction product is obtained by reacting an addition product of a polymerizable unsaturated vinyl monomer having one hydroxyl group and a polyisocyanate with an acrylic polymer having a hydroxyl equivalent of 500 to 3000, a carboxylic equivalent of 200 to 1700 and a number average molecular weight of about 3000 to about 100,000, and further contains a urethanated polymerizable compound obtained by reacting a mono or di-hydroxycarboxylic acid, polyisocyanate compound and polymerizable unsaturated vinyl monomer having one hydroxyl group.

The composition of the present invention can be used for a wide range of purposes compared with the composition of the prior art because the composition of the present invention does not have such defects as low mechanical strength, poor water resistance, poor alkali resistance and poor acid resistance which are characteristic of the compositions in the art. In other words, if a resin having a urethane bond in its skeletal structure is provided with carboxylic equivalent of more than 100, the above-mentioned defects can be eliminated and at the same time, the bending property and mechanical strength imparted by the urethane bond and the polar effect imparted by the carboxylic group, are involved effectively, thereby the adhesiveness to the surfaces of non-ferrous metals such as aluminum and copper and to the surface of siliceous material can be improved.

In the present invention, the term "unsaturation equivalent" means the molecular weight per one mole of carbon-to-carbon unsaturated double bonds in the molecular chain, and the units are grams per one carbon-to-carbon unsaturated double bond. The term "carboxylic equivalent" means the molecular weight per one mole of carboxylic groups in the molecular chain, and the units are grams per one carboxylic group. Further, the term "hydroxyl equivalent" means the molecular weight per one mole of hydroxyl groups in the molecular chain, and the units are grams per one hydroxyl group.

The reaction product used in the composition of the present invention has an unsaturation equivalent of 800 to 3500, preferably 1000 to 2000 and carboxyl equivalent of 300 to 1800, preferably 350 to 1300. If the unsaturation equivalent is less than 800, preparation of the reaction product is very difficult because thixotropy of the resin becomes very high. When the unsaturation equivalent is more than 1300, a long time is required for curing because cross-linking points are few. As for the carboxylic equivalent of the reaction product in the present invention, if this value is less than 300, the reaction product loses the solubility in a dilute alkaline solution. On the other hand, if this value is more than 1800, the cured film is inferior in water resistance. Therefore, it is necessary that the ranges of unsaturation equivalent and carboxyl equivalent have to be, respectively, from 800 to 3000 and from 300 to 1800.

The reaction product is obtained by reacting the addition product of a polymerizable unsaturated vinyl monomer having one hydroxyl group and a polyisocyanate with an acrylic polymer having a hydroxyl equivalent of 500 to 3000, a carboxylic equivalent of 200 to 1700 and a number average molecular weight of about 3000 to about 100,000, preferably 10,000 to 50,000.

The addition product to obtain the reaction product is prepared by reacting $(n-1)$ moles of the polymerizable unsaturated vinyl monomer having one hydroxyl group with 1 mole of the polyisocyanate having $n$ moles of isocyanate groups. For example, one mole of the polymerizable unsaturated vinyl monomer having one hydroxyl group is used when the polyisocyanate is a diisocyanate, and two moles of this vinyl monomer having one hydroxyl group is used when the polyisocyanate is a triisocyanate. The addition reaction is carried out by the same method as known in the art, for example, the polymerizable unsaturated vinyl monomer having one hydroxyl group is gradually dropped into the polyisocyanate with stirring and heating at about 50° C. until isocyanate value (NCO-mg./Resin-g.) reaches the theoretical value of isocyanate groups desired to remain.

The polymerizable unsaturated vinyl monomer having one hydroxyl group used in the present invention to prepare the addition product has the following general formula:

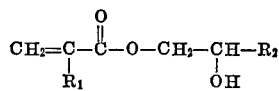

in which $R_1$ is hydrogen or methyl group, and $R_2$ is hydrogen, methyl group or ethyl group. Examples of this vinyl monomer are 2-hydroxethyl acrylate, 2-hydroxypropyl acrylate, 2 - hydroxybutyl acrylate, 2 - hydroxyethyl methacrylate, 2-hydroxy propyl methacrylate and 2-hydroxybutyl methacrylate. These vinyl monomers may be used alone or in a mixture.

The polyisocyanate having $n$ moles of isocyanate groups is a diisocyanate or triisocyanate. Examples of the polyisocyanate are tolylene diisocyanate, xylylene diisocyanate, hexamethylene diisocyanate, diphenylmethane-4,4'-diisocyanate, 2,4,6 - tolylene triisocyanate and a compound of the following formulae

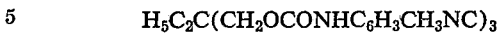

and $OCN(CH_2)_6N[COHN(CH_2)_6NCO]_2$.

The last named polyisocyanate is commercially available as Desmodur N. The acrylic polymer having a hydroxyl equivalent of 500 to 3000, a carboxylic equivalent of 200 to 1700 and number average molecular weight of about 3000 to about 100,000 to prepare the addition product is obtained by the ordinary polymerization method. The polymerizable unsaturated vinyl monomer having one hydroxyl group mentioned before has to be used in the range of 4 to 30 weight percent based on total weight of the polymerizable unsaturated vinyl monomer to introduce the hydroxyl groups into the acrylic polymer. Further, the polymerizable unsaturated vinyl monomer having one carboxylic group has to be used in the range of 4 to 40 weight percent based on total weight of the polymerizable unsaturated vinyl monomer to introduce the carboxylic groups into the acrylic polymer. Examples of the polymerizable carboxylic monomer are preferably acrylic acid and methacrylic acid, and a half-esterification compound by monoalcohol having 1 to 4 carbon atoms of maleic acid or its anhydride may be used as the introducing component of carboxylic groups. Other polymerizable unsaturated vinyl monomers are used such as the vinyl monomer components used for the ordinary acrylic resin. The polymerization reaction is carried out by ordinary methods for preparing the ordinary acrylic resin.

The hydroxyl equivalent and carboxylic equivalent of the acrylic polymer is determined in order to keep the unsaturation equivalent and carboxylic equivalent of the final reaction product within the before-mentioned limitations. If the number average molecular weight of the acrylic resin is more than about 100,000, it is difficult to carry out a successive reaction because thixotropy of the acrylic resin obtained becomes high. When the number average molecular weight of the acrylic resin is less than about 3000, it is inferior in mechanical property of the film cured using the final reaction product from this acrylic resin.

Successively, the reaction to prepare the reaction product is carried out with stirring and heating at 50 to 100° C. The combination ratio of the addition product and the acrylic polymer is theoretically one mole of isocyanate groups in the addition product with one mole of hydroxyl groups in the acrylic polymer. The reaction is ended when the isocyanate value (NCO-mg./Resin-g.) reaches less than 5 by measuring.

Further in the present invention, the reaction product may be used in combination with an urethanated polymerizable compound in order to improve the curing property of the composition and physical property of the cured film. This urethanated polymerizable compound has to be used in a range of less than 40 weight percent based on total weight of the acrylic polymer and the urethanated polymerizable compound. If the urethanated polymerizable compound is not less than 40 weight percent, the adhesiveness of the composition to the substrate is inferior.

The urethanated polymerizable compound is obtained by reacting a mono- or di-hydroxylcarboxylic acid, polyisocyanate compound and polymerizable unsaturated vinyl monomer having one hydroxyl group. This urethanated polymerizable compound is employed as a cross linking component.

Both the polyisocyanate compound and polymerizable unsaturated vinyl monomer having one hydroxyl group are the same compounds before-mentioned. Examples of mono- or di-hydroxycarboxylic acid are $\alpha,\alpha'$-dihydroxymethyl propionic acid, $\alpha,\alpha'$-dihydroxymethyl butyric acid, tartaric acid, dihydroxy cinnamic acid, dihydroxy malonic acid, dihydroxy benzoic acid, lactic acid, citric acid, salicylic acid, hydroxy butyric acid, hydroxy glutaric acid and hydroxy phthalic acid.

The hydroxyl group of mono- or di-hydroxycarboxylic acid reacts easily with the isocyanate group of the polyisocyanate compound to form the urethanated polymerizable compounds having unsaturated carbon-to-carbon bond through urethane linkage and carboxlic group.

There are various methods for such a reaction, and any of them may be used in the invention, however, in practice, the following typical reactions may be exemplified as the fundamental examples of the reactions.

METHOD I

Reactants

| | Moles |
|---|---|
| Polymerizable unsaturated vinyl monomer having one hydroxyl group (2-hydroxyethyl methacrylate) | 2 |
| Diisocyanate compound (tolylene diisocyanate) | 2 |
| Dihydroxy carboxylic acid ($\alpha,\alpha'$-dihydroxymethyl propionic acid) | 1 |

Reaction product

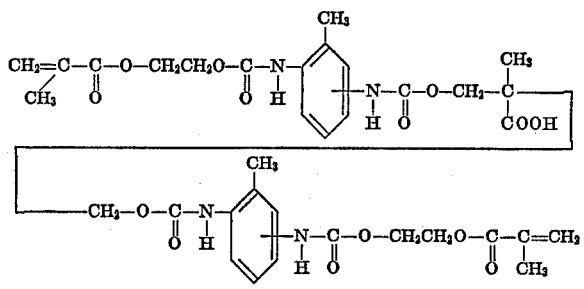

METHOD II

Reactants

| | Moles |
|---|---|
| Polymerizable unsaturated vinyl monomer having one hydroxyl group (2-hydroxyethyl methacrylate) | 2 |
| Triisocyanate compound (2,4,6-tolylene triisocyanate) | 1 |
| Monohydroxy carboxylic acid (citric acid) | 1 |

Reaction product

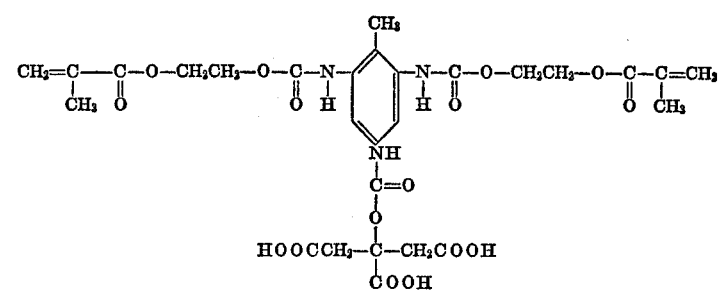

In the above first method, two unsaturated carbon-to-carbon bonds through urethane linkages are combined by using the dihydroxycarboxylic acid as the hydroxycarboxylic acid, however, in the second method, the urethanated polymerizable compound is obtained by reacting the monohydroxycarboxylic acid with the triisocyanate. As stated in the above, from the preparation of the urethanated polymerizable compound used for the composition of the present invention, any of the above two fundamental methods may be used according to the situation.

The order of the reactions of the reactants of the invention is not restricted especially, and the reactions may be carried out according to the conveniences of the object to be expected and that of the reaction apparatus. For example, tolylene diisocyanate can be reacted with $\alpha,\alpha'$-dihydroxy propionic acid, and thereafter 2-hydroxymethyl methacrylate is allowed to react with the above reaction product, or, 2-hydroxyethyl methacrylate can be reacted with tolylene diisocyanate and thereafter $\alpha,\alpha'$-dihydroxymethyl propionic acid is allowed to react with the reaction product thereof. Both sequences may be employed for carrying out the object of the present invention without any disadvantage.

In the preparation of the urethanated polymerizable compound of the invention, the intermediate product produced in the first step and the urethanated polymerizable compound produced in the next step are solid in many cases. In such cases, appropriate solvents are to be used in order to proceed in the liquid state. The solvents used for such purpose must not contain a component which reacts with an isocyanate group such as hydroxyl group and amino group. Further, the solubility for the urethanated polymerizable compound may be taken into consideration when they are used.

The urethanated polymerizable compound of the invention is a polyfunctional compound which has unsaturated carbon-to-carbon bonds. Thus, there is the risk of becoming useless through gelation by a spontaneous polymerization reaction in the production steps and during the storage period. Accordingly, it is necessary to add a proper polymerization inhibitor in order to prevent such polymerization. As the polymerization inhibitor which can be used for such purpose, those which do not react with the isocyanate group, such as benzoquinone and chloranil, may be used.

The composition of the invention has a very fine and firm structure after curing, which depends upon not only the fact that the highly dense cross linkages are contained in the structure but also that the main portion of such cross linkages consist of the urethane bonds which are excellent in the adhesive property. Accordingly, various chemicals cannot permeate into the structure of the coating film, and therefore, the chemical resistance of the cured film of the composition of the invention becomes excellent though it is very high in acid value. According to the object and convenience of the use, the composition of the invention may be mixed together with other synthetic resins in an amount of less than 10 weight percent based on the reaction product of the invention, other ethylenically unsaturated monomers in an amount of less than 10 weight percent based on the reaction product of the invention, plasticizers, solvents other than those used in the preparation of each component, pigments, dyestuffs, fillers, etc.

The composition of the invention can be cured or hardened through various methods. One is to add a polymerization initiator. For example, p-benzoquinone, benzoyl peroxide, azobisisobutyronitrile or dicumyl peroxide in an amount of 0.01 to 5% by weight is added to the composition of the invention, and the composition is cured by heating at a temperature of 70 to 200° C. after applying on a substrate in the form of coating film. Further, if 0.01 to 5% by weight of a redox type polymerization initiator, such as the combination of benzoyl peroxide and dimethyl, aniline, or methyl ethyl ketone peroxide and cobalt naphthenate, is added shortly before the use of the composition, the composition can be cured at room temperature.

Another method to cure the composition of the invention is to use ionizing radiation or actinic rays. In case of ionizing radiation, the curing can be carried out in a very short time by employing a large power electron accelerator, which will be advantageous in the commercial production process. For example, when an electron accelerator of 300 kev. energy and of 25 ma. electron beam is employed, the composition can be cured sufficiently with radiation of only 0.1 to 20 mrad. dose. Curing by irradiation of actinic rays, the formation of design patterns suitable for the preparaton of printing plates may be easily carried out. In this case, the period of irradiation can be reduced by the addition of photosensitizers to the composition. As such photosensitizers, for example, Michler's ketone, benzoin, N,N-dibutyl-p-nitrosoaniline, benzoin methyl ether α-methyl benzoin, α-phenyl benzoin, diacetyl acetophenone and benzoquinone may be used. The amount of the addition of them may be 0.01 to 5% by weight to the resin composition.

As the light source of such radiation, for example, chemical lamp, low pressure mercury lamp, carbon arc lamp, xenon lamp and sunlight can be used. The period of irradiation of the actinic rays may vary according to the condition of the composition and the kind and intensity of the light source, however, is generally within the range of 1 second to 30 minutes.

The following examples show various aspects of the invention in greater detail. It should be understood, however, that these are only illustrative of the invention. Other combinations and variations of the embodiments shown will no doubt occur to those skilled in the art. These are considered to be part of the invention.

In the following examples, unless otherwise indicated, all parts and percentages are by weight.

EXAMPLE 1

A mixture of monomers consisting of 15% of acrylic acid, 15% of 2-hydroxyethyl methacrylate, 35% of ethyl acrylate and 35% of methyl methacrylate was mixed with 2% of azobisisobutyronitrile, and polymerized in dioxane at a temperature of 110 ± 5° C. to obtain an acrylic resin solution. The resin obtained had a hydroxyl equivalent of 867, carboxylic equivalent of 480 and number average molecular weight of about 20,000. The solid content in said solution was adjusted to 50%.

348 g. (2 moles) of tolylene diisocyanate (commercially available product containing 20% of 2,6-compound and 80% of 2,4-compound) was charged into a flask, heated at 60 ± 2° C., and then 260 g. (2 moles) of 2-hydroxyethyl methacrylate containing 500 p.p.m. of p-benzoquinone was dropped into said flask and caused to react to form an addition product.

200 g. of the above acrylic resin solution was allowed to react with 30 g. of said addition product at about 80° C. for 5 hours to obtain the solution of the reaction product. The thus obtained reaction product had an unsaturation equivalent of 1300 and carboxyl equivalent of 630. The solid content of said solution was 56.5%.

The thus prepared reaction product solution was mixed with 1% of benzoin ethyl ether as the photosensitizer, and applied to the surface of a degreased aluminum plate at a ratio of about 2 mg./cm.². After evaporation of the solvent contained, the coating film was irradiated with ultraviolet rays from the Chemical Lamp SL-20BL (trade name of an ultraviolet lamp made by Tokyo Shibaura Electric Co., Ltd., Japan) for five minutes with the distance of 6 cm. Thereby the coating film was cured. The uncured film after the evaporation of the solvent was not sticky and it could be washed out with 1% aqueous solution of caustic soda at room temperature. However, after curing of the coating film, swelling or any other change was not observed through contact with said caustic solution for 24 hours at room temperature. Further, through contact with 1% hydrochloric acid solution, any change of the cured film was not observed too. The results of tests with regard to the mechanical properties, especially to the adhesiveness to substrate of said cured coating film were shown in the following Table 1.

EXAMPLE 2

A mixture of monomers consisting of 10% of acrylic acid, 10% of 2-hydroxyethyl methacrylate, 40% of ethyl acrylate and 40% of methyl methacrylate was mixed with 1% of benzoyl peroxide, and the mixture was polymerized in a mixed solvent of dioxane and methyl isobutyl ketone at a temperature of 110±5° C. to obtain an acrylic resin solution. The resin obtained had a hydroxyl equivalent of 1300, carboxylic equivalent of 720 and number average molecular weight of about 40,000. The solid content of said solution was adjusted to 50%.

Thereafter, 200 g. of the thus prepared acrylic resin solution was mixed with 20 g. of the addition product prepared in Example 1, and was subjected to urethanation reaction for 5 hours at a temperature of about 80° C., thus preparing the reaction product solution. This product had an unsaturation equivalent of 1800 and carboxylic equivalent of 877. The solid content of the product was about 54.5%.

121.6 g. of the addition product prepared in Example 1 was dissolved into the same amount of dioxane, and heated at 80±2° C. It was further mixed with 26.8 g. of α,α'-dihydroxymethyl propionic acid and caused to react for about 5 hours at the same temperature to prepare the urethanated polymerizable compound solution. The solid content of the above product was about 55% and the acid value was 75.

The thus prepared 70 g. of the reaction product solution and 30 g. of the urethanated polymerizable compound solution were mixed well, and the mixture was mixed with 0.5 g. of benzoin ethyl ether to obtain the composition.

The composition was applied to the degreased surface of a steel plate at the ratio of about 4 mg./cm.², and after the evaporation of the solvent, the thus formed coating film was irradiated with ultraviolet rays from the high pressure mercury lamp used in Example 1 for 1 minute at the distance of 60 cm. The uncured coating film after the evaporation of the solvent was not sticky, and it was soluble in 1% aqueous caustic soda. The properties after the curing of the coating film are shown in the following Table 1.

EXAMPLE 3

A mixture of monomers containing 30% of methacrylic acid, 10% of 2-hydroxypropyl methacrylate, 40% of ethyl acrylate and 20% of methyl methacrylate was mixed with 2% of azobisisobutyronitrile, and the mixture was polymerized in a mixed solution of dioxane and methyl isobutyl ketone at a temperature of 80 to 90° C. to prepare acrylic resin solution. This resin had a carboxylic equivalent of 287, hydroxyl equivalent of 1440 and number average molecular weight of about 20,000. The solid content of said solution was adjusted to 50%. Then, the thus prepared acrylic resin solution in the amount of 200 g. was mixed with 20 g. of the addition product prepared by the same method of Example 1, except 288 g. (2 moles) of 2-hydroxypropyl methacrylate instead of 260 g. (2 moles) of 2-hydroxyethyl methacrylate, and subjected to urethanation reaction for 5 hours at about 80° C. to obtain the reaction product solution. This product had an unsaturation equivalent of 1884 and carboxylic equivalent of 344. The solid content of said solution was about 54.2%.

239 g. (0.5 mole) of Desmodur N (trade name of the triisocyanate compound made by Farbenfabriken Bayer A.G.) was caused to react with 130 g. (1 mole) of 2-hydroxyethyl methacrylate containing 500 p.p.m. of p-benzoquinone at about 90° C. Thereafter, it was mixed drop by drop with 45 g. (0.5 mole) of lactic acid and caused to react at the same temperature to obtain the urethanated polymerizable compound solution. The acid value of this product was 67.

Into 100 g. of the above-mentioned reaction product solution was mixed 22.5 g. of the above urethanated polymerizable compound solution, and the mixture was further mixed with 0.7 g. of Michler's ketone to obtain the composition.

Said composition was applied to the degreased surface of a zinc galvanized steel plate at the ratio of about 2 mg./cm.$^2$, and after evaporation of the solvent in the coated film, the film was applied with ultraviolet rays from 6 cm. distance for 5 minutes by means of the Chemical Lamp used in Example 1. The properties of this composition are shown in the following Table 1.

pressure mercury lamp (trade name: Unipulse UM-301 made by Ushio Electric Inc.) from a distance of 35 cm. The intensity of the ultraviolet rays applied to the surface was 750 w./m.$^2$. The test results of curing time, hardness and other properties of the coating film are shown in the following Table. 2. The above intensity of the ultraviolet irradiation is the maximum value at the center of the coating film.

In place of the above-mentioned carbon black, rutile type titanium white was used and tested in the same manner, the results of which are also shown in the following Table 2.

TABLE 1

| Test: | Example 1 | Example 2 | Example 3 |
|---|---|---|---|
| Alkali resistance (0.1% caustic soda solution—24 hours) | No change | No change | No change. |
| Acid resistance (0.1% hydrochloric acid solution—24 hours) | do | do | Do. |
| Shock resistance (Du Pont impact tester, ½ inch, 500 g.) | Good | Good | Good. |
| Bending test (φ 10 mm./sec.) | do | do | Do. |
| Adhesiveness (cross-cut-tape adhesion test) | 100/100 | 100/100 | 100/100. |

EXAMPLE 4

Carbon black was added into 100 parts of the reaction product solution prepared in the foregoing Example 1, and well dispersed by a pebble mill until the particle size became less than 20 microns (measured by fineness gauge). The thus obtained composition in an amount of 100 parts was added with 3 parts of photosensitizer (benzoin ethyl ether), 10 parts of dioxane and 10 parts of ethyl alcohol, and was mixed and dispersed well by a stirrer to obtain a photocurable coating composition. Thereafter, the composition was applied to a degreased mild steel plate (7 cm. x 15 cm.) at the rate of 100 g./m.$^2$, and after evaporation of the solvent, the coated film was cured by 3 KW high

EXAMPLES 5–6

Each composition was prepared according to the following Table 3 in like manner as Example 4, and was subjected to several tests, the results of which are shown in the following Table 4.

COMPARATIVE EXAMPLE

The tests were carried out in like manner as Example 5 except that a low pressure mercury lamp was used to cure the coating film. The inside of the coating film was not sufficiently cured. The results of the tests are shown in the following Table 4.

TABLE 2

| Pigment as used | | Curing time,[1] minutes | Film thickness, microns | Pencil hardness [2] | | Weather resistance [3] | Acid resistance [4] | Storage stability [5] |
|---|---|---|---|---|---|---|---|---|
| Pigment | Parts | | | Just after curing | After 24 hours | | | |
| Carbon black | 2 | 2 | 30 | 2B | F | Good | Good | Good. |
|  | 5 | 5 | 30 | 3B | HB | do | do | Do. |
| Rutile type titanium white. | 10 | 3 | 30 | B | H | do | do | Do. |
|  | 20 | 6 | 30 | 2B | F | do | do | Do. |
|  | 40 | 20 | 30 | 5B | HB | do | do | Do. |

See footnotes at end of table 5.

TABLE 3

| | Ratios of components for coating compositions | | | | |
|---|---|---|---|---|---|
| Example | Vehicle | Pigment | Body pigment | Sensitizer | Solvent |
| 5 | Example 2 (100 parts) | Rutile type titanium white (15 parts). | Calcium carbonate (10 parts). | Benzoin ethyl ether (0.5 part). | Dioxane (10 parts), acetone (10 parts). |
| 6 | Example 3 (50 parts) | Cyanine blue (5 parts) | | Benzoin (3 parts) | Acetone (10 parts), ethyl alcohol (10 parts). |

TABLE 4

| | Irradiation condition | | | | Pencil hardness [2] | | | | | |
|---|---|---|---|---|---|---|---|---|---|---|
| | Lamp | Distance (cm.) | Intensity of UV rays (W/m.$^2$) | Article to be coated (7 x 15 cm.) | Curing time,[1] minutes | Film thickness, microns | Just after curing | After 24 hours | Adhesiveness [6] | Acid resistance [3] | Storage stability [5] |
| Example: | | | | | | The film was burnt within 4 minutes | | | | | |
| 5 | HPML [7] | 10 | 900 | Plywood plate | | | | | | | |
|  |  | 20 | 500 |  | 5 | 30 | HB | 2H | Good | Good | Good. |
|  |  | 30 | 300 |  | 7 | 30 | B | H | do | do | Do. |
|  |  | 50 | 100 |  | 30 | 30 | 3B | B | do | do | Do. |
| 6 | ArcL [8] | 30 | 200 | Aluminum plate | 9 | 30 | B | H | do | do | Do. |
| Comparative example. | LPML [9] | 10 | 10 | Mild steel plate | ([10]) | | | | | | |

See footnotes at end of Table 5.

TABLE 5

| Abbreviations | Apparatus | Power | Trade name | Manufacturer |
|---|---|---|---|---|
| HPML [7] | High pressure mercury lamp. | 4 kw. | H-4000 L/2 | Tokyo Shibaura Electric Co., Ltd. |
| ArcL [8] | Arc lamp | 2 kw. | Jet Light 2000 | ORC Manufacturing Co., Ltd. |
| LPML [9] | Low pressure mercury lamp. | 20 W | Chemical Lamp | Tokyo Shibaura Electric Co., Ltd. |

[1] Curing time. The time in which the coating film being cured and dried is indicated.
[2] Pencil hardness: A set of pencils ranging from 6B soft to 6H hard was pushed in turn into the film at 45 degrees to the surface. The hardest pencil by which film is not broken is indicated as pencil hardness.
[3] Weather resistance: The light irradiation was 500 hours by sunshine Weather-O-Meter
[4] Acid resistance: The test piece was immersed in 1% hydrochloric acid solution at room temperature for 24 hours.
[5] Storage stability: A test sample of the coating film was sealed up in a plastic vessel and was kept standing at 35° C. for 3 months.
[6] Adhesiveness: Check patterned cross-cuts which reached to the substrate were formed on a test piece and Scotch tape was adhered on said cuts, then pressed down uniformly on the tape. Thereafter said tape was peeled off and it was observed whether the coating was peeled off or not.
[7][8][9] Abbreviations.
[10] Not cured.

EXAMPLE 7

2 parts of carbon black was dispersed into 100 parts (as solid) of the reaction product solution prepared in Example 1 to prepare a black enamel. The enamel was applied in 30 to 40 micron thickness on a portion of the bonnet of an automobile which was coated with a thermosetting acrylic resin enamel. It was left for about 30 minutes in the shade, and thereafter dried at 60° C. for 30 minutes. A regenerated cellulose film in which a bird pattern was transparent and other portion was opaque, was applied over said coating film with Scotch tape, and irradiated with a 2 kw. high pressure mercury lamp from 30 cm. distance for 5 minutes. Thereafter, said mask was removed from the coating and washed with 2% aqueous solution of caustic soda, and thereby an embossed bird pattern was formed. This pattern was dried at 60° C. for 30 minutes to obtain a clear pattern with an embossed thickness of about 20 to 30 microns. The adhesiveness to the thermosetting acrylic resin film was very good, and the gloss was satisfactory, thereby an excellent decorative effect could be given.

What is claimed is:

1. A composition for preparing resin coating film comprising a reaction product having an unsaturation equivalent of 850 to 3500 and a carboxylic equivalent of 300 to 1800, in which the reaction product is obtained by reacting (a) an addition product of a polyisocyanate with $n-1$ moles per mole of polyisocyanate of a polymerizable unsaturated vinyl monomer having one hydroxyl group, wherein $n$ is the number of moles of isocyanate groups in the polyisocyanate, with (b) an acrylic polymer having a hydroxyl equivalent of 500 to 3000, a carboxylic equivalent of 200 to 1700, and a number average molecular weight of about 3000 to 100,000.

2. A composition for preparing resin coating film according to claim 1, in which said polymerizable unsaturated vinyl monomer having one hydroxyl group is selected from the group consisting of 2-hydroxyethyl acrylate, 2-hydroxypropyl acrylate, 2-hydroxybutyl acrylate, 2-hydroxyethyl methacrylate, 2-hydroxypropyl methacrylate and 2-hydroxybutyl methacrylate.

3. A composition for preparing resin coating film according to claim 1, in which said polyisocyanate is selected from the group consisting of tolylene diisocyanate, xylylene diisocyanate, hexamethylene diisocyanate, diphenylmethane-4,4'-diisocyanate, 2,4,6-tolylene triisocyanate and a compound of the following formulae:

$$H_5C_2C(CH_2OCONHC_6H_3CH_3NCO)_3$$

and $$OCN(CH_2)_6N[CONH(CH_2)_6NCO]_2.$$

4. A composition for preparing resin coating film according to claim 1 further comprising urethanated polymerizable compound obtained by reacting mono- or dihydroxycarboxylic acid, polyisocyanate compound and polymerizable unsaturated vinyl monomer having one hydroxyl group.

5. A composition for preparing resin coating film according to claim 4, in which said polymerizable unsaturated vinyl monomer having one hydroxyl group is selected from the group consisting of 2-hydroxyethyl acrylate, 2-hydroxypropyl acrylate, 2-hydroxybutyl acrylate, 2-hydroxyethyl methacrylate, 2-hydroxypropyl methacrylate and 2-hydroxybutyl methacrylate.

6. A composition for preparing resin coating film according to claim 4, in which said polyisocyanate is selected from the group consisting of tolylene diisocyanate, xylylene diisocyanate, hexamethylene diisocyanate, diphenylmethane-4,4'-diisocyanate, 2,4,6-tolylene triisocyanate and a compound of the following formulae:

$$H_5C_2C(CH_2OCONHC_6H_3CH_3NCO)_3$$

and $$OCN(CH_2)_6N[CONH(CH_2)_6NO]_2.$$

7. A composition for preparing resin coating film according to claim 4, in which said mono- or di-hydroxy carboxylic acid is selected from the group consisting of $\alpha,\alpha'$-dihydroxymethyl propionic acid, $\alpha,\alpha'$-dihydroxymethyl butyric acid, tartaric acid, dihydroxy cinnamic acid, dihydroxy malonic acid, dihydroxy benzoic acid, lactic acid, citric acid, salicylic acid, hydroxy butyric acid, hydroxy glutaric acid and hydroxy phthalic acid.

8. A composition for preparing resin coating film according to claim 1 wherein said reaction product has an unsaturation equivalent of 1000 to 2000 and a carboxylic equivalent of 350 to 1300 and wherein said acrylic polymer has a number average molecular weight of about 10,000 to 50,000.

9. A composition for preparing resin coating film according to claim 1 in which said acrylic polymer is the polymerization product of polymerizable unsaturated vinyl monomer having one hydroxyl group, polymerizable unsaturated vinyl monomer having one carboxylic group and polymerizable unsaturated vinyl monomer.

10. A composition for preparing resin coating film according to claim 9 in which said polymerizable unsaturated vinyl monomer having one carboxylic group is selected from the group consisting of acrylic acid, methacrylic acid, and half ester of maleic acid or the anhydride thereof with monoalcohol having 1 to 4 carbon atoms.

11. A composition for preparing resin coating film according to claim 1 in which said addition product is of ingredients comprising tolylene diisocyanate and 2-hydroxyethyl methacrylate and said acrylic polymer is of ingredients comprising acrylic acid, 2-hydroxyethyl methacrylate, ethyl acrylate and methyl methacrylate.

12. A composition for preparing resin coating film according to claim 4 in which said addition product is of ingredients comprising tolylene diisocyanate and 2-hydroxypropyl methacrylate, said acrylic resin is of ingredients comprising methacrylic acid, 2-hydroxypropyl methacrylate, ethyl acrylate and methyl methacrylate, and in which said urethaned polymerizable compound is of ingredients comprising lactic acid, $$OCN(CH_2)_6N[CONH(CH_2)_6NCO]_2$$

and 2-hydroxyethyl methacrylate.

References Cited
UNITED STATES PATENTS

| | | | |
|---|---|---|---|
| 3,632,796 | 1/1972 | Holicky et al. | 260—77.5 CR |
| 3,607,974 | 9/1971 | Holicky et al. | 260—77.5 CR |

MAURICE J. WELSH, Primary Examiner

U.S. Cl. X.R.

117—132 B; 260—30.4 N, 32.8 N, 33.4 UR, 37 N, 77.5 BB

UNITED STATES PATENT OFFICE
CERTIFICATE OF CORRECTION

Patent No. 3,775,377  Dated November 27, 1973

Inventor(s) Tomoo Kokawa

It is certified that error appears in the above-identified patent and that said Letters Patent are hereby corrected as shown below:

Column 3, line 26, for "1300" read -- 3500 --

Signed and sealed this 16th day of July 1974.

(SEAL)
Attest:

McCOY M. GIBSON, JR.
Attesting Officer

C. MARSHALL DANN
Commissioner of Patents